United States Patent
Castelli et al.

(10) Patent No.: US 6,326,965 B1
(45) Date of Patent: *Dec. 4, 2001

(54) INTERACTIVE REPRESENTATION AND RETRIEVAL OF MULTI-DIMENSIONAL DATA USING VIEW ELEMENTS

(75) Inventors: Vittorio Castelli, White Plains; Chung-Sheng Li, Ossining; John Richard Smith, New Hyde Park, all of NY (US)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/079,662

(22) Filed: May 15, 1998

Related U.S. Application Data

(60) Provisional application No. 60/081,654, filed on Apr. 14, 1998.

(51) Int. Cl.[7] ................................................. G06T 17/00

(52) U.S. Cl. ........................ 345/420; 345/139; 345/356; 345/435; 707/104; 707/101; 382/232

(58) Field of Search .................................... 345/419, 356, 345/420, 435; 707/104, 101; 382/232, 233

(56) References Cited

U.S. PATENT DOCUMENTS

| | | | |
|---|---|---|---|
| 5,384,725 | 1/1995 | Coifman et al. | 364/807 |
| 5,710,835 * | 1/1998 | Bradley | 382/233 |
| 5,734,893 * | 3/1998 | Li et al. | 707/104 |
| 6,021,224 * | 2/2000 | Castelli et al. | 382/232 |

OTHER PUBLICATIONS

P.J. Burt et al., "The Laplacian Pyramid as a Compact Image Code", IEEE Transactions on Communications, pp. 532–540, COM–31, No. 4, Apr. 1983.

R.C. Coifman et al., "Entropy–Based Algorithms for Best Basis Selection", IEEE Transactions on Information Theory, pp, 713–718, vol. 38, No. 2, Mar. 1992.

(List continued on next page.)

Primary Examiner—Mark Zimmerman
Assistant Examiner—Kimbinh T. Nguyen
(74) Attorney, Agent, or Firm—F. Chau & Associates, LL

(57) ABSTRACT

An apparatus and method for representing and retrieving multi-dimensional data such as large satellite images. Images are stored in forms that allow them to be rapidly browsed and retrieved by remote client applications in a drill-down fashion. The data can be represented and retrieved using a view element data structure that includes node elements and transition elements between nodes. The data is decomposed (in space or spatial-frequency to construct a tree-based or graph-based data structure) into view elements. A set of view elements is selected, compressed and stored without adversely impacting image view extraction or generation speed. View elements are placed into the node elements of the data structure and the transition elements indicate the processing to generate other view elements in the data structure. In a server-side view construction, the view elements are selectively retrieved from storage, decompressed, and processed to generate the views of the data. In a client-side progressive view construction, the client caches the view elements and processes them in combination with view elements retrieved from the server to generate views of the data. The data reuse at the client reduces data transmission in drill-down or roll-up browsing. Data can be ingested, read and written in units of spatial blocks and decomposed into view elements using the spatial block units. Thus, the ingestion, decomposition, compression, and view retrieval for large images can be done using computer devices that have limited storage and processing capabilities.

14 Claims, 9 Drawing Sheets

OTHER PUBLICATIONS

FlashPix™ format and Architecture White Paper, ©1996 Eastman Kodak Company, 27 pages.

Hanan Samet, "The Wuadtree and Related Hierarchical Data Structures", Computing Surveys, vol. 16, No. 2, pp. 187–257, Jun. 1984.

J.R. Smith et al., "Joint Adaptive Space and Frequency Basis Selection", Copyright 1997 IEEE, Presented at ICIP'97, Oct. 26–29, 1997.

J.W. Woods et al., "Subband Coding of Images", IEEE Transactions on Acoustics, Speech, and Signal Processing, pp. 1278–1288, vo. ASSP–34, No. 5, Oct. 1986.

* cited by examiner

INTERACTIVE REPRESENTATION AND RETRIEVAL OF MULTI-DIMENSIONAL DATA USING VIEW ELEMENTS

CROSS-REFERENCE TO RELATED APPLICATIONS

This application claims the benefit of U.S. provisional Patent Application No. 60/081,654 filed Apr. 14, 1998.

The present invention is related to co-pending patent application Ser. No. 09/079,662, entitled "Interactive Retrieval and Caching of Multi-dimensional Data," by Castelli et al., filed of even date herewith. This co-pending application and the present invention are commonly assigned to the International Business Machines Corporation, Armonk, NY. This co-pending application is hereby incorporated by reference in its entirety into the present application.

FIELD OF THE INVENTION

The present invention relates to information handling systems and in particular to the compression interactive retrieval of multi-dimensional data including but not limited to digital images, audio, video, and multi-dimensional lattice data.

BACKGROUND

Computer networks create powerful environments for the search and retrieval of distributed information. However, due to bandwidth limitations, computer networks are often not suited for interactively browsing large amounts of data. As a result, retrieving and displaying large images can be a slow process. Image compression is effective in reducing the amount of data for storing and transmitting images, however, most image compression algorithms are optimized for rate and distortion performance rather than to facilitate interactive image retrieval. The interactive retrieval of large images is a form of browsing in which the views of portions of the image data are successively retrieved in a drill-down or roll-up fashion.

Hierarchical data structures such as the wavelet packet tree, as taught by Coifman, et al., [Coifman, et al., 92], and the spatial quad-tree, as taught by Samet [Samet, 84], can be used to decompose images into a hierarchies of views. They use tree-based data structures to arrange the views of the image data into parent-child dependency relationships. The views of the images can be generated by decomposing the parent elements or by synthesizing together the children elements. Coifman, et al. taught a method for selecting the view elements in the wavelet packet tree in order to represent the image data completely and without information loss. Similar methods can be applied to the spatial quad-tree for representing the image data by a complete set of spatial segments.

In the wavelet packet tree, the view elements correspond to various spatial-frequency subbands. In particular, some of these subbands correspond to low-resolution views of the image data. However, none of the view elements in the wavelet packet tree correspond to spatial segments of the image data. On the other hand, the view elements in the spatial quad-tree correspond to various spatial segments of the image data, but only at full resolution.

The spatial quad-tree and wavelet packet tree can be integrated in a graph data structure as taught by Smith and Chang [Smith and Chang, 97]. The view elements in the space and frequency graph correspond to spatial segments of the various spatial-frequency subbands. Some of the view elements in the space and frequency graph correspond to the spatial segments of the low-resolution views of the image data. Smith and Chang developed a method for selecting the view elements in the space and frequency graph in order to optimize the compression of the image data in terms of rate-distortion performance. The method decomposes the image data into a redundant set of view elements, assigns each view element a compression cost and selects a complete and non-redundant set of view elements based on the compression costs. The selected view elements can be used to reconstruct the image data. However, Smith and Chang did not explore the use of the space and frequency graph for accessing or constructing the segmented multi-resolution views of the image data needed by applications that involve the interactive retrieval of the images.

The Flashpix image format has been used for progressively retrieving large images over the Internet using the Internet Imaging Protocol. The user-applications compose views of the images by retrieving tiles from the Flashpix files at the server [Eastman Kodak Co. 1996]. In order to speedup the retrieval of multi-resolution image views, the Flashpix-based servers store multiple versions of the image at different scales, which results in a redundancy of information of 133% [Burt and Adelson 1983]. The Flashpix format is also capable of storing the image non-redundantly, but, it then requires added processing to extract the image views. In both cases, the Flashpix-based systems do not reuse data at the client to reduce data transmission in drill-down or roll-up browsing.

There is benefit in storing the images in forms that allow the images to be rapidly browsed and retrieved by remote client applications in a drill-down fashion. Furthermore, there is added benefit of storing the data in a compressed form without adversely impacting the speed at which the image views are extracted or generated.

SUMMARY OF THE INVENTION

In accordance with the aforementioned needs, the present invention is directed towards an apparatus and method for ingesting, compressing and retrieving images and multi-dimensional lattice data. The invention has features that enable the following:

1. Compression: the data is decomposed into view elements, and a set of the view elements is selected, compressed, and stored to generate a compressed representation of the data.

2. Server-side view construction: the view elements are selectively retrieved from storage, decompressed, and processed to generate the views of the data.

3. Client-side progressive view construction: the client caches the view elements and processes them in combination with view elements retrieved from the server to generate views of the data.

The present invention has features for ingesting the data in units of spatial blocks and for performing the decomposition into view elements using the spatial block units. In general, the present invention has features for reading and writing the view elements and views in units of spatial blocks. These features enable the present invention to handle the ingestion, decomposition, compression, and view retrieval for large images using computer devices that have limited storage and processing capabilities.

An apparatus and method for representing and retrieving data using view elements utilizes a view element data structure that contains node and transition elements. An apparatus and method for representing and retrieving data using view elements places the view elements into the node elements of the data structure and defines transition elements of the data structure that indicate the methods for processing view elements in the view element data structure in order to generate other view elements in the data structured An apparatus and method for representing and retrieving data using view elements can decompose the data in space or spatial-frequency to construct a tree-based hierarchy view element data structure.

An apparatus and method for representing and retrieving data using view elements can decompose the data jointly in space and spatial-frequency to construct a graph-based hierarchy view element data structure.

An apparatus for representing and retrieving data using the view elements indexes the view elements according to their position in the view element data structure.

An apparatus for representing and retrieving data using view elements makes a selection of view elements from the view element data structure in order to represent the data using view elements and to generate views of the data using view elements.

An apparatus for representing and retrieving data using view elements develops a program for processing the selected view elements in order to generate views and other view elements.

An apparatus for representing and retrieving data using view elements utilizes a client-side view element data structure and view element cache in order to enable the progressive and interactive retrieval, or drill-down and roll-up browsing of images over a computer network.

BRIEF DESCRIPTION OF THE DRAWINGS

These and other features and advantages of the present invention will be apparent to those of skill in the art from the accompanying detailed description, claims and drawings, wherein:

DETAILED DESCRIPTION

Figure 1:
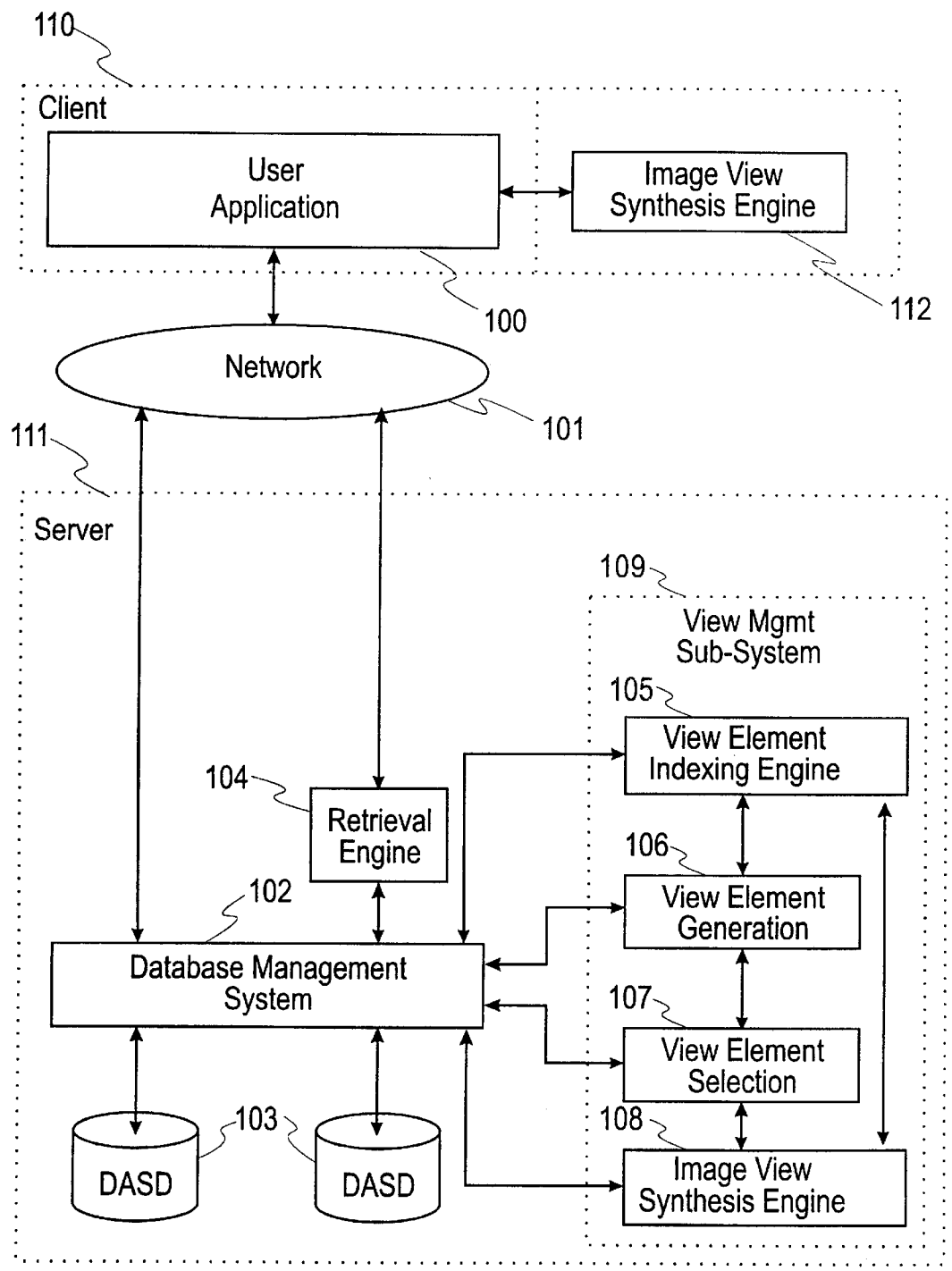
FIG. 1 illustrates an example of a networked client-server system having features of the present invention.

FIG. 1 depicts an example of a networked client-server system having features of the present invention. As depicted, one or more clients (110) and servers (111) are interconnected by a network (101). Examples of networks are local area networks (LAN) or wide area networks, e.g., an intranet or the Internet. A server (111) includes a conventional database management system (DBMS) (102) and direct access storage devices (DASD) (103). Through a user application (100) the user can issue requests for views of the multi-dimensional data, such as image data, to be processed at a server (111). A request is typically prepared on a client machine (110) and is submitted to the server (111) through the network (101). A request typically interacts with the database management system (102) for retrieving or updating the data stored in a DASD (103).

According to the present invention, the server (111) includes a view management sub-system (109). The view management sub-system (109) includes a view element indexing engine (105), which is responsible for accessing the view elements required to generate the view requested in the query. The image data in the DBMS is decomposed into view elements by the view element generation engine (106). The view element generation engine (106) constructs a view element data structure. The view element selection engine (107) selects a set of view elements from the indexed hierarchy, to be stored by the DBMS (102) in the DASD (103). Examples of view element generation, organization, selection and storage will be discussed in more detail with reference to FIG. 2 and FIGS. 5–8.

In response to a query, an image view synthesis engine (108) retrieves view elements from the DBMS (102) and synthesizes the view. The view is returned to the DBMS (102), the retrieval engine (104) or the client (110). As an alternative to a server-based synthesis of the view, the view elements can be returned directly to the client (110) where the views can be synthesized using a client-resident image view synthesis engine (112). An example of a process for constructing the image views from a view element representation will be described in more detail with reference to FIG. 3. Examples of processes for interactively retrieving image views using view elements will be described in more detail with reference to FIG. 4 and FIG. 9. For example, views may be interactively retrieved by an application (100) in which the client (110) caches the view elements for reuse in efficiently generating subsequent views.

Those skilled in the art will appreciate that the present invention includes features which can be implemented as computer instructions ("software") tangibly embodied on a computer program product or program storage device for execution on a processor (not shown) provided with client (110) and/or server (111). For example, software implemented in a popular object-oriented computer executable code such as JAVA (a trademark of Sun MicroSystems), provides portability across different platforms. Those skilled in the art will appreciate that many other conventional procedure-oriented and object-oriented (OO) programming technologies can also be employed.

In particular, those skilled in the art will appreciate that methods of the present invention may be implemented as software for execution on a computer or other processor-based device. The software may be embodied on a magnetic, electrical, optical, or other persistent program and/or data storage device, including but not limited to: magnetic disks, DASD, bubble memory; tape; optical disks such as CD-ROMs; and other persistent (also called nonvolatile) storage devices such as core, ROM, PROM, flash memory, or battery backed RAM. Those skilled in the art will appreciate that within the spirit and scope of the present invention, one or more of the components instantiated in the memory of the client (110) or server (111) could be accessed and maintained directly via DASD (103) or disk (not shown), the network (101), another server, or could be distributed across a plurality of servers (111).

Figure 2:
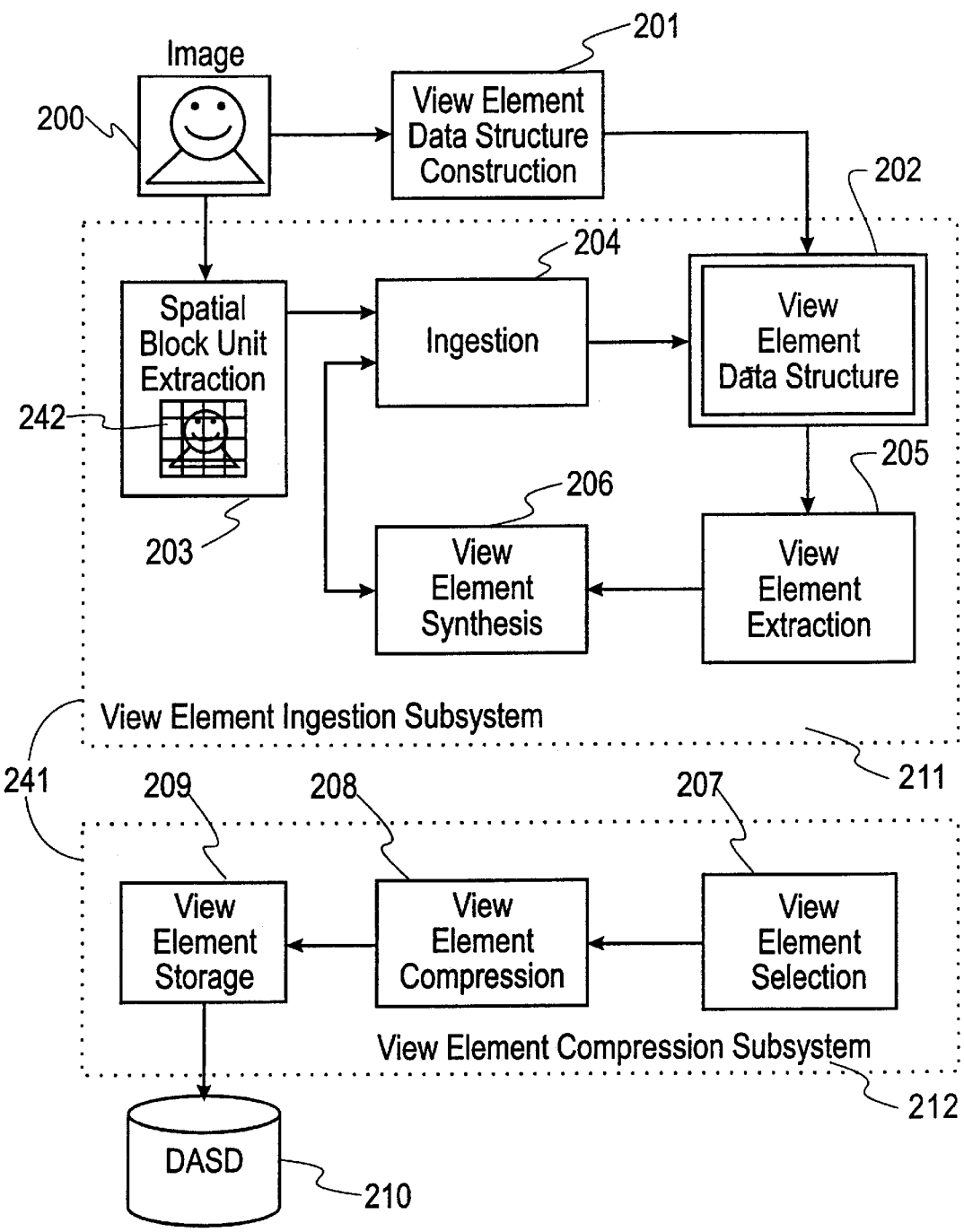
FIG. 2 illustrates a an example of a process for ingesting, representing and compressing images using view elements.

FIG. 2 illustrates an example of a block diagram and process for ingesting (211) and compressing (212) the images using view elements. In step 201, a view element data structure (202), for managing and indexing the view elements, is constructed. Examples of the view element data structure (202) will be described with reference to FIGS. 5–9). Although a preferred embodiment uses a space and frequency graph decomposition, the view element data structure (202) can be constructed from other image decompositions including but not limited to: a spatial quad-tree [Samet 1984]; and a wavelet packet tree [Coifman 1993]. The view element data structure (202) can be stored in resident computer memory (211) or disk storage such as DASD (210).

Figure 5:
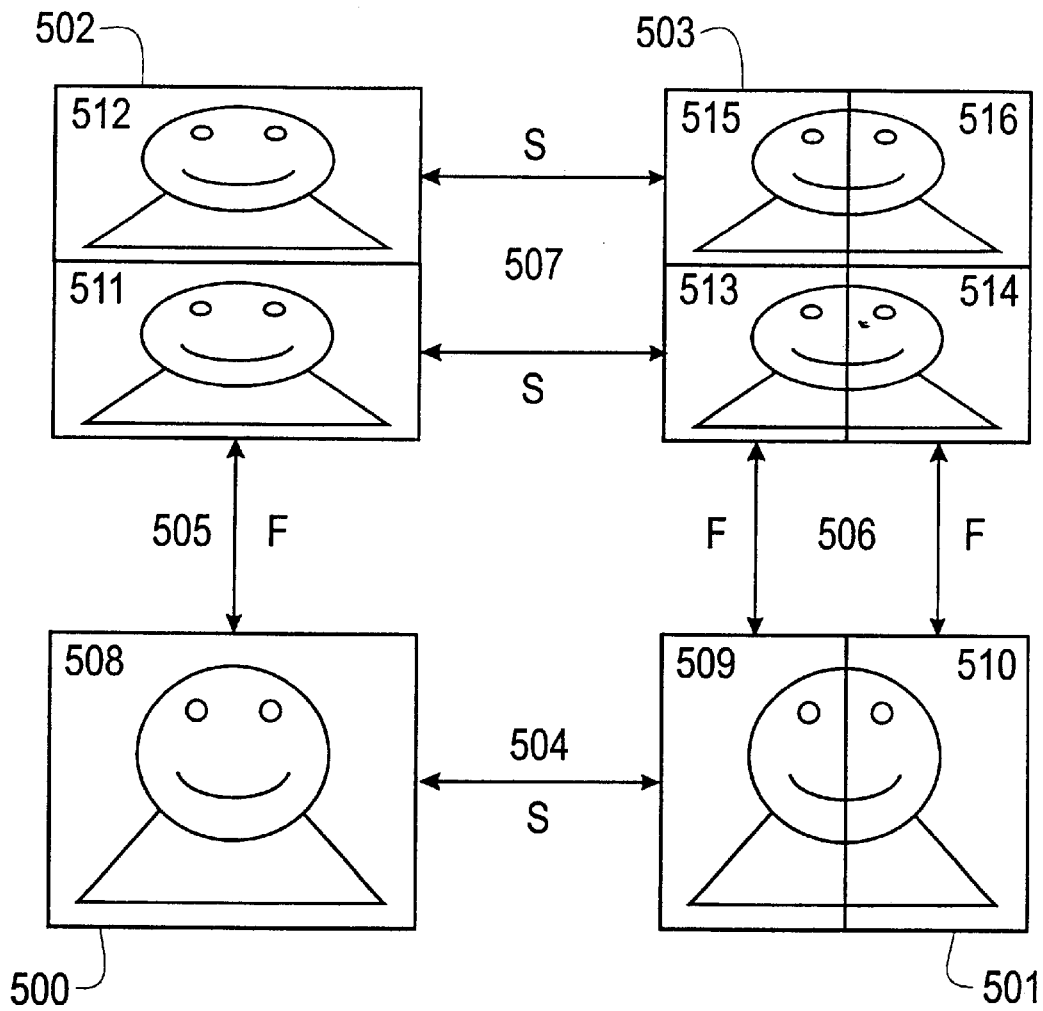
FIG. 5 illustrates an example of the commutativity in the spatial segmentation and frequency decomposition.

Referring now to FIG. 5, the view element data structure includes node elements (500–503) and transition elements (504–507). In one embodiment, each node element (500–503) stores lattice point data and meta-data associated with a particular view element and each transition element (504–507) connects an input group of view elements (508) to an output group of view elements (511, 512). The transition elements define methods by which the input groups of view elements can be processed to generate the output groups of view elements. Examples of the processing methods include spatial segmentation, frequency decomposition, spatial composition and frequency synthesis.

Returning now to FIG. 2, the view element data structure construction step (201) can consider the attributes of the input image (200), such as image width, height and color depth, in constructing the view element data structure (202). For example, the depth of the view element hierarchy data structure (202) can be determined from the size of the image.

The image (200) is supplied to the view element ingestion subsystem (211), which uses the view element data structure (202) to represent the image using view elements. Optionally, the image can be decomposed into spatial block units (212), in step (203). The spatial block unit extraction process separates the image into a disjoint set of spatial partitions that completely cover the image. The spatial block unit extraction process can be used to handle large input images such as satellite images with limited computing and storage resources.

The image (200), or optionally, the spatial block units (242), are fed into the ingestion subsystem (203). In step 204, the data is stored into the node elements of the view element data structure (202). Additional view elements are generated and placed into the node elements of the view element data structure (202) in steps 205–6 and 204. In step 205, the view elements are extracted from the view element data structure (202) and in step 206 are fed into the view element synthesis engine (108). The view element synthesis engine (108) synthesizes new view elements by processing the input view elements in accordance with the methods defined by the transition elements in the view element data structure (202). This processing can involve frequency analysis, spatial decomposition, frequency synthesis and spatial composition in generating the view elements. The new view elements are then fed back into the ingestion step 204 and are inserted into the node elements of the view element data structure (202).

The processes of spatial block unit extraction (203), ingestion (204), view element extraction (205), view element synthesis (206) and view element ingestion (204) can be repeated until the input image (200) is fully ingested into the view element data structure (202).

The representation and compression of the image using view elements is accomplished by the view element compression subsystem (212). In step 207, the view element selection logic (107) selects a set of view elements from the view element data structure (202). The view element sets can be selected on the basis of many factors, including: optimizing the rate-distortion compression performance; minimizing an additive information cost function such as entropy [Coifman and Wickerhauser 1992]; optimizing view extraction speed; minimizing storage space; or satisfying constraints of completeness or non-redundancy [Smith 1998]. In step 208, the selected view elements can be compressed using lossy compression (such as JPEG) or lossless compression (such as LZW). In step 209, the selected view elements are fed into the view element storage subsystem (for example DBMS (102)). The view element storage subsystem then stores the view elements DASD (210).

Figure 3:
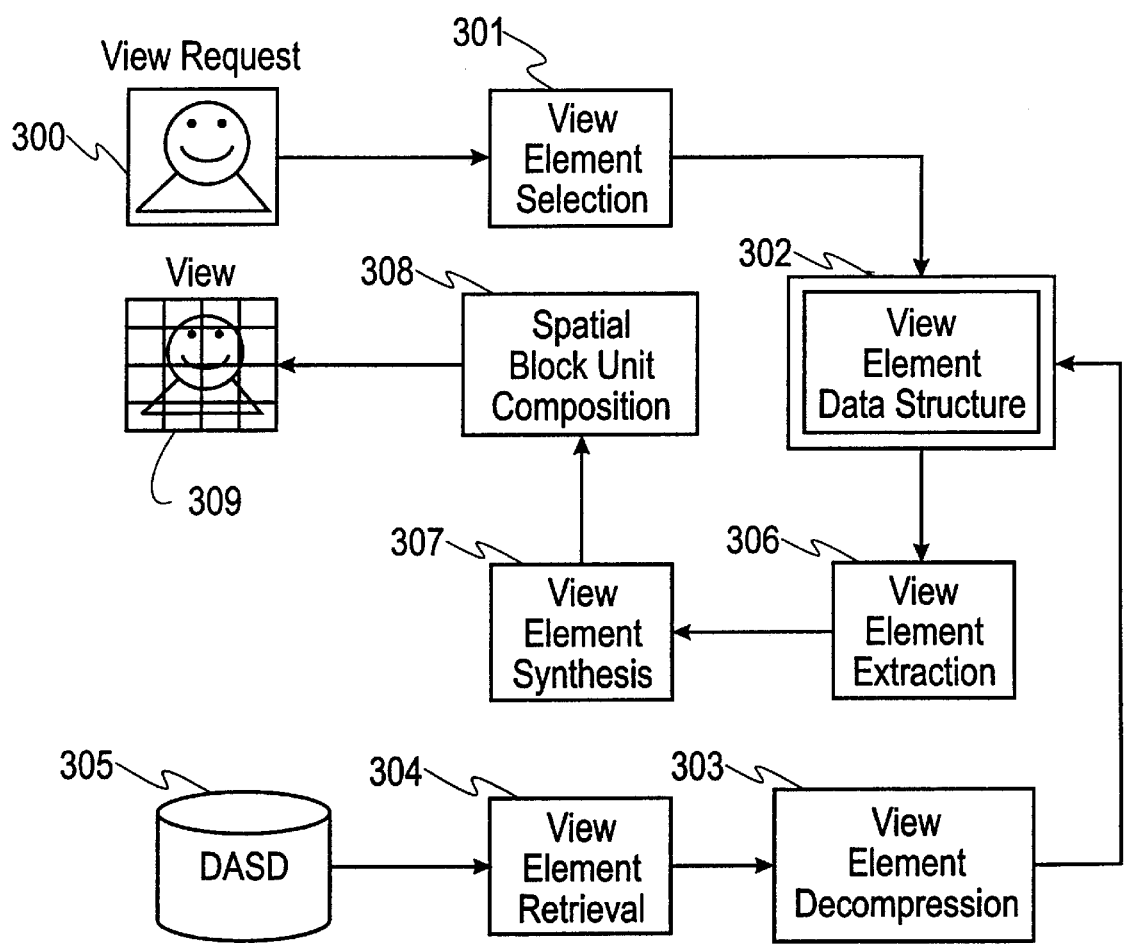
FIG. 3 illustrates an example of a process for constructing the image views from the view element representation.

FIG. 3 illustrates an example of a block diagram and process for generating views of an image from the view elements. As depicted, in step 300, the system is supplied with a view request. Here, the view request specifies a region of interest from the image in terms of spatial dimensions and resolution. The view request is translated into a selection of view elements, in step 301. The view element selection subsystem (107) compares the view elements in storage (305) to the view elements that are needed to satisfy the view request. The view element selection subsystem analyzes in concert, the node elements of the view elements in storage, the node elements of the requested view, and the transition nodes between view elements in the view element data structure (302). On the basis of this analysis, the view element selection subsystem selects a set of view elements from storage (305) and defines a processing program by which the view elements can be retrieved from storage (305) and processed to generate the requested view. The selection of view elements and determination of the processing program can be made on the basis of retrieval and processing costs.

The selected view elements are retrieved from DASD (305) in the view element retrieval step 304. In step 303, the view elements are decompressed (if they were compressed), and then inserted into the view element data structure (302). In step 306, the view elements are extracted as necessary from the view element data structure (302). In step 307, the view elements are synthesized by the view element synthesis engine (108) according to the processing program (identified by the transition nodes). The view element engine generates the requested view from the view elements. The requested view can be written to disk or transmitted in units of spatial blocks, in step 308, to deliver the image view (309) to the client (110).

Figure 4:
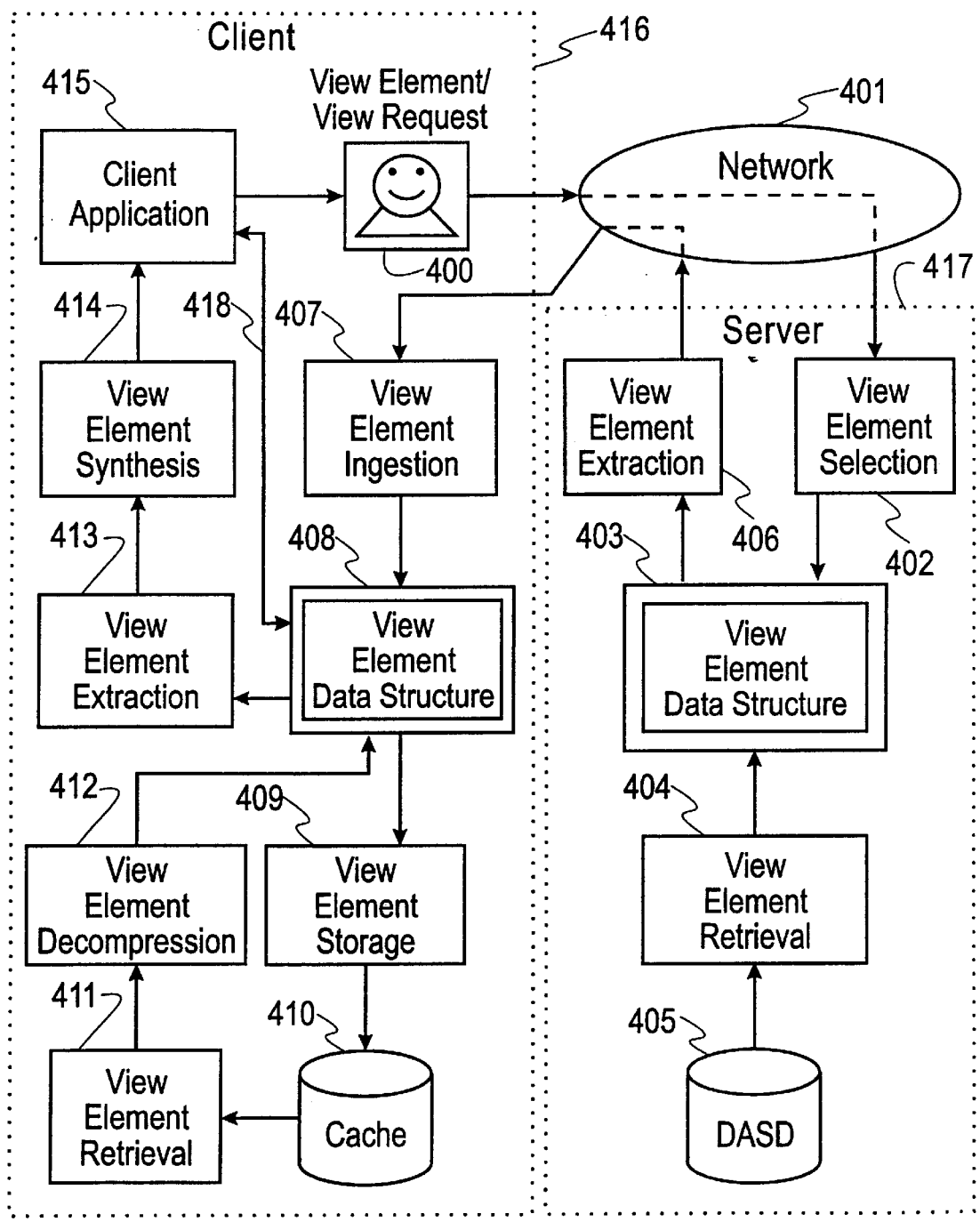
FIG. 4 illustrates an example of a process for interactively retrieving image views using view elements.

FIG. 4 illustrates an example of a block diagram and process for interactively retrieving views of the image data by a client application (415) in which the client (416) caches the view elements (410) for reuse in generating views. By way of overview, the client application (415) initially issues a view request (400) to the server (417) through the network (401). In response, the server (417) delivers the view, or view elements back to the client (415).

In step 402, the view request is handled at the server (417) by the view element selection logic which selects the view elements from the server-side view element data structure (403). The view element selection procedure follows that described earlier with reference to step 301 in FIG. 3. In step 404, the selected view elements are retrieved from the DASD (405) by the view element retrieval engine (104) and are inserted into the view element data structure (403) at the server (417). In step 406, the view elements are extracted from the view element data structure (403) and are delivered to the client (416) through the network (401).

In step 407, the client (416) receives the view elements from the server and ingests them into the client-side view element data structure (408). In step 409, the view elements are then stored in the client-side cache (410), for possible reuse, by the view element storage subsystem.

The requested view can be then generated by the client (416) as follows: the view elements are extracted from the view element data structure, in step 413; and are processed by the view element synthesis engine (108), in step 414, to synthesize the view. The view is then delivered to the client application (415).

For subsequent view requests by the client application (415), a search is first performed, in step 418, in the client-side view element data structure (408) to examine what view elements are currently stored in the client cache (410). Since the client (416) stores view elements in the client cache (410), some of the view elements can be provided by the client. The client application can then indicate to the server in the view request (400) the set of view elements that are in the client cache. The server (417) then performs the view element selection and extraction process to select a set of view elements to deliver to the client (416).

As described earlier with reference to step 301 in FIG. 3, the view element selection logic examines the view element data structure (403) in order to make the selection. In addition, the view element selection step considers the information sent from the client in step (400) that specifies the set of view elements that are stored in the client cache. The view element selection logic may also consider factors such as: client processing; retrieval costs; storage constraints; network transmission costs; server processing; and retrieval costs, in selecting the view elements.

Alternatively, the view element selection (step 402) can be performed by the client. In this case, the client examines what view elements are stored in the client cache (410) and server storage (405), makes a selection of view elements, and issues the view element selection to the server in step (400).

The client application makes the request (400) to the server (417) through the network (401) to retrieve the view elements. The server (417) retrieves the view elements from the server storage (405) and delivers the view elements to the client. The client receives these view elements and inserts them into the client-side view element data structure (408).

In the steps involving the view element retrieval (step 404) at the server through view element storage at the client (step 409), the view elements may be retained in a compressed form to reduce the amount of data that needs to be handled. In order to generate the view requested by the client application, the view elements are retrieved in step 411 from the client cache (410). The view elements are decompressed (if necessary) in step 412, and are inserted into the view element data structure (408). The view elements are extracted from the view element data structure in step 413 and are processed in step 414 to synthesize the view. The view is delivered by the view element synthesis engine (414) to the client application (415).

FIG. 5 illustrates an example of a decomposition of an image into view elements using transition elements. Here, the view element data structure is implemented as a space and frequency graph view element hierarchy data structure. The view elements (508 . . . 514) correspond to node elements (500 . . . 503), and the space and frequency operators (504 . . . 507) correspond to the transition elements of the space and frequency graph view element hierarchy data structure.

A spatial segmentation ($^S$) operator (504) generates segmented view elements (509) and (510). In general, the spatial segmentation can be iterated to perform a quad-tree segmentation of the image [Samet 1984]. A frequency decomposition ($^F$) operator (505) generates low-frequency (511) and high-frequency (512) subband view elements, respectively. In general, the frequency decomposition can be iterated to perform a subband decomposition of the image [Woods and O'Neil 1986].

Furthermore, the spatial segmentation and frequency decomposition can be integrated. For example, a segmentation $^S$ can be performed on a frequency subband view element (511) (generated by frequency decomposition) to generate space and frequency view elements (513 and 514). Likewise, a frequency decomposition $^F$ can be performed on a view element (509) (that was generated by segmentation) to generate space and frequency view elements (513 and 515).

In the case that the frequency decomposition $^F$ is performed in a partitionable-form, the frequency decomposition and segmentation operations are commutative [Smith and Chang 1997]. This allows the construction of a space and frequency graph view element hierarchy data structure for managing the view elements (illustrated in more detail FIG. 6).

Figure 6:
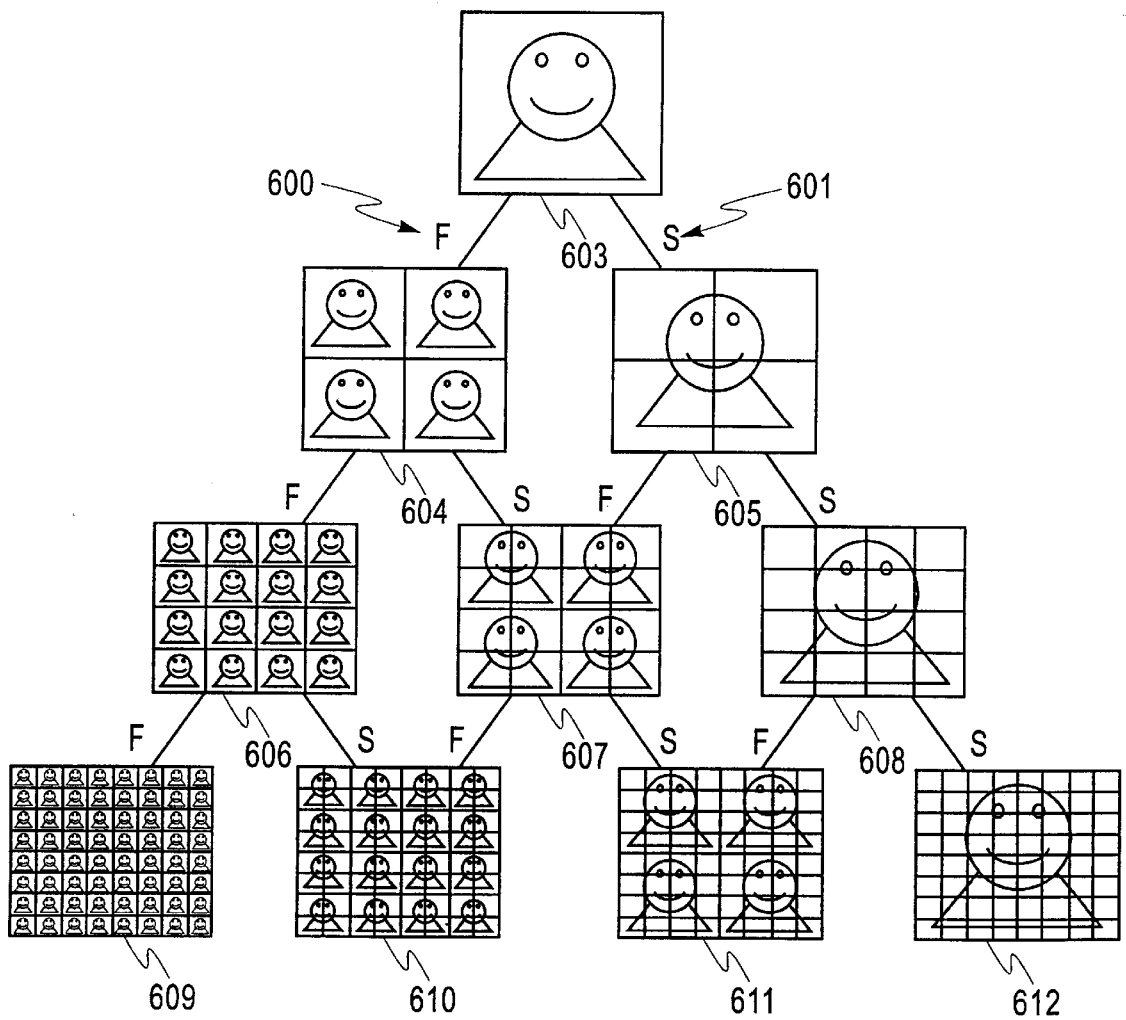
FIG. 6 illustrates an example of a space and frequency graph view element hierarchy data structure.

FIG. 6 illustrates an example of a space and frequency graph (SFGraph) view element hierarchy data structure [Smith and Chang 1997]. The view element nodes are collected in the SFGraph view element hierarchy data structure into node blocks (603, 604, . . . , 612). The node blocks are organized hierarchically to provide an overall organization of the view element nodes. Each of the node blocks of the SFGraph view element hierarchy collects the view elements that have the same spatial coverage and resolution. The spatial coverage can be determined by the number of spatial decomposition operations ($^S$) used to generate the view elements in the node block. The resolution can be determined by the number of frequency decomposition operations ($^F$) used to generate the view elements in the node block. Each spatial decomposition decreases the spatial coverage by one half. Each frequency decomposition decreases the resolution by one half. For example, the view elements in node block (611) have a spatial coverage of one quarter the image coverage and a resolution of one-half, since there are two spatial decompositions ($^S$) and one frequency decomposition ($^F$) required to generate those view elements.

The SFGraph view element hierarchy data structure can be used to manage the view elements for large satellite images. The SFGraph is effective in this application because some of the view elements of the SFGraph correspond directly to views of specific spatial areas of the large images at different resolutions. View elements of this type are of interest to users of satellite image retrieval systems.

In general, since views are represented within the space and frequency graph, it is possible to synthesize the views from any complete and non-redundant set of view elements in the space and frequency graph. Furthermore, a number of alternative sets of view elements and transition paths in the space and frequency graph may be used for constructing the views within the space and frequency graph. This allows the space and frequency graph to be used for interactively retrieving views of the image by progressively retrieving and re-using the view elements.

Figure 7:
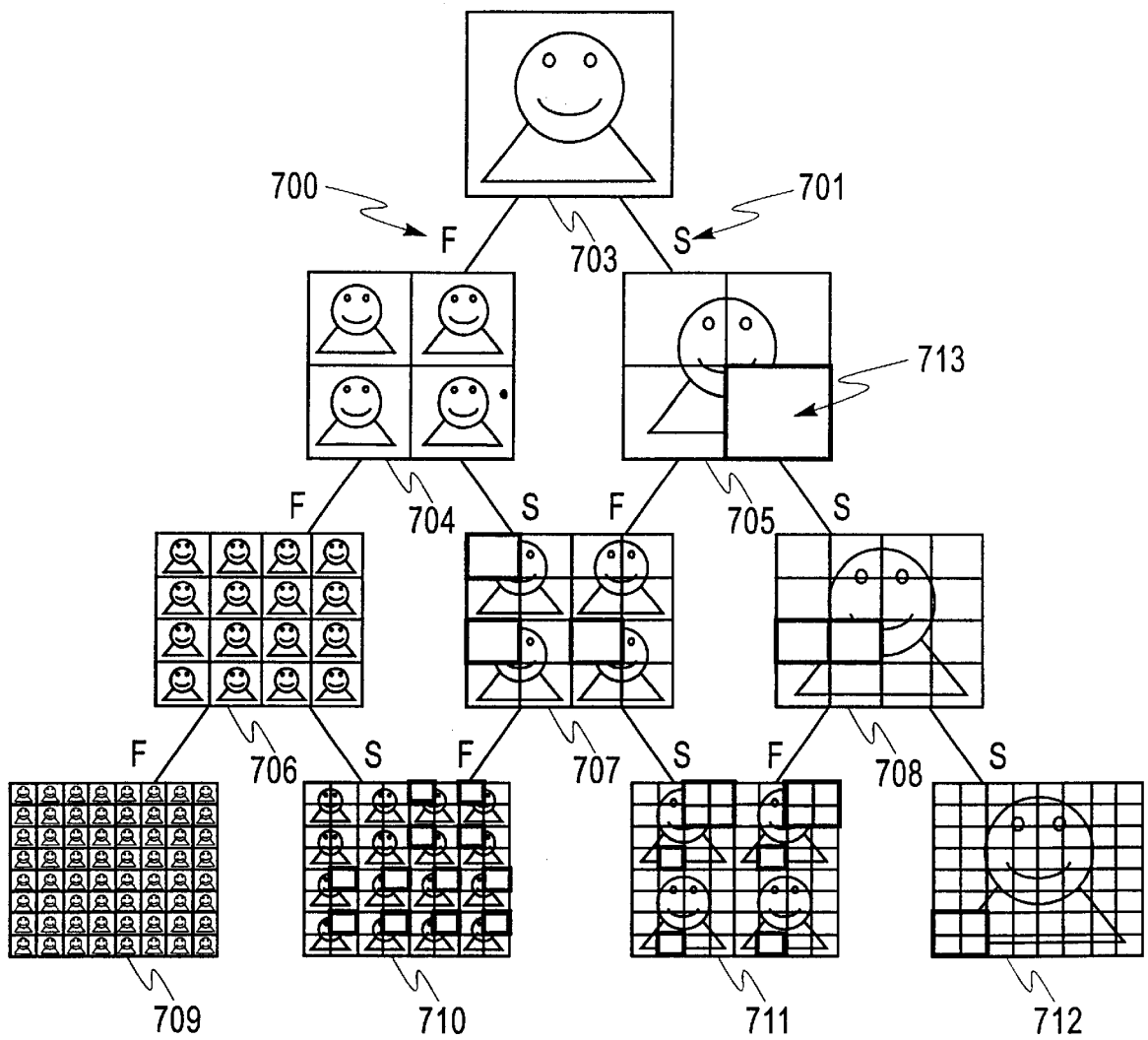
FIG. 7 illustrates an example selection of view elements from the space and frequency graph view element hierarchy data structure.

FIG. 7 illustrates an example of a non-redundant and complete set of view elements selected from the SFGraph view element hierarchy. The set of view elements typifies a set that is selected by the view element compression subsystem described with reference to FIG. 2. The selected view elements (713) are indicated by the shaded elements. In order to represent the images, these view elements are compressed (in step 208) and are stored (in step 209). The remaining view elements, which are not shaded in FIG. 7, can be generated from the selected set of view elements by retrieving, decompressing and processing the view elements as described with reference to FIG. 3, in accordance with the space and frequency transition elements of the space and frequency graph view element data structure.

Figure 8:
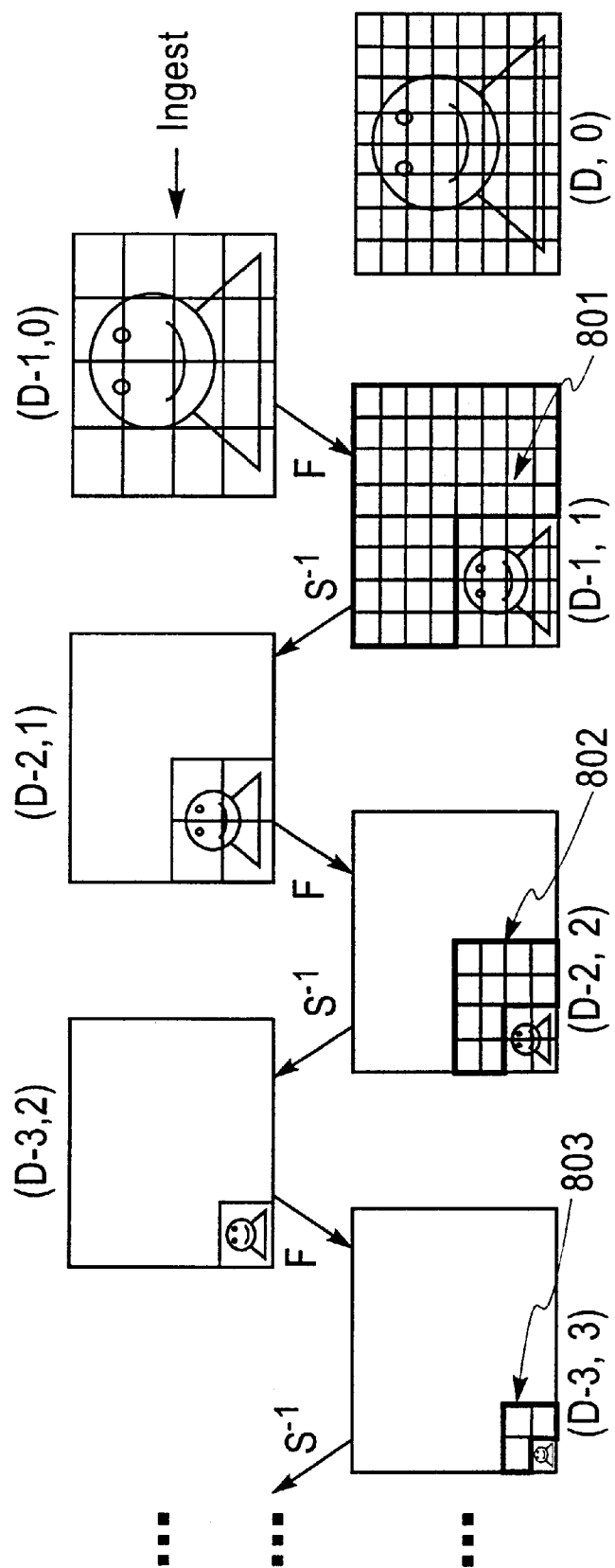
FIG. 8 illustrates an example process for ingesting large satellite images into the space and frequency graph view element hierarchy data structure and representing the images using the tiled-wavelet set of view elements.

FIG. 8 illustrates an example of a process for ingesting large satellite images into the a SFGraph hierarchy view element data structure and representing the large satellite images using a set of view elements from the SFGraph view element data structure. In this example, the images are represented by the a tiled-wavelet set of view elements.

The tiled-wavelet set of view elements corresponds to the view elements generated in a wavelet transformation of the image in which the wavelet subbands are partitioned into a disjoint and complete set of tiles. In practice, another set of view elements approximates the tiled-wavelet set by alternatively performing the wavelet transform on non-overlapping spatial partitions of the image. In this example of using a tiled-wavelet set of view elements to represent large satellite images, the ingestion (204), view element extraction (205), and processing (206) can be performed as follows:

1. The spatial block units of the image are ingested into the SFGraph view element hierarchy data structure into the node block with spatial ($^S$) depth and frequency ($^F$) depth given by $(^{S,F})=(^{D-1,0})$, where $^D$ is the overall depth of the SFGraph view element hierarchy.

2. Then, the $^F$ decomposition is performed on the view elements belonging to the node block $(^{D-1,0})$ to generate the view elements belonging to the node block $(^{D-1,1})$ as follows:
   Perform $^F$ decomposition of each view element belonging to node block $(^{D-1,0})$
   Insert the resultant view elements into the SFGraph view element hierarchy data structure at node block $(^{D-1,1})$.
   Extract the high frequency (HF) view elements (801) from the SFGraph view element hierarchy data structure and compress (208) and store (209) them.

3. Repeat these steps for the following node blocks $(^{S,F})=(^{D-2,1}) \ldots (^{0,D-1})$ as follows: extract the spatial children LF view elements, synthesize $^{S-1}$ the parent view elements and perform the $^F$ decomposition on the parent view elements. In each stage, the high frequency view elements (i.e., 802, 803) are extracted from the SFGraph view element hierarchy data structure, and are compressed (208) and stored (209). At the last stage, the remaining LF view element is also compressed and stored.

As illustrated in FIG. 8, the view elements belonging to the tiled-wavelet set of view elements have fixed data size and correspond to various spatial coverages and frequency subbands. The only low-frequency view element retained in the tiled-wavelet view element set belongs to node block $(^{0,D})$, and corresponds a low resolution view of the entire image. The other retained elements correspond to higher frequency subbands of the spatial segments of the image.

The views of the image that correspond to arbitrary spatial areas of the image at different resolutions can be generated from the tiled-wavelet set of view elements by reversing the previous process of ingestion and view element processing. For example, given a requested image view $V(^{d,x,y,w,h})$ with a resolution of $^d$ and a spatial coverage of $(^{x,y,w,h})$, the view is constructed from the tiled-wavelet set of view elements as follows:

1. Extract and decompress the view elements belonging to node block $(^{0,D})$ that spatially intersect with $^V$, and synthesize $^F$ the parent elements in the node block $(^{0,D-1})$.

2. Perform $^S$ decomposition of the view elements belonging to node block $(^{0,D-1})$ and store the resultant view elements in the node block $(^{1,D-1})$.

3. Repeat these steps for node blocks $(^{S,F})=(^{1,D-2}), \ldots, (^{d-1,D-d+2})$.

4. Crop the view elements belonging to the node block $(^{d,D-d+1})$ along boundaries of intersection with $^V$, and spatially composite them together to generate the image view.

Figure 9:
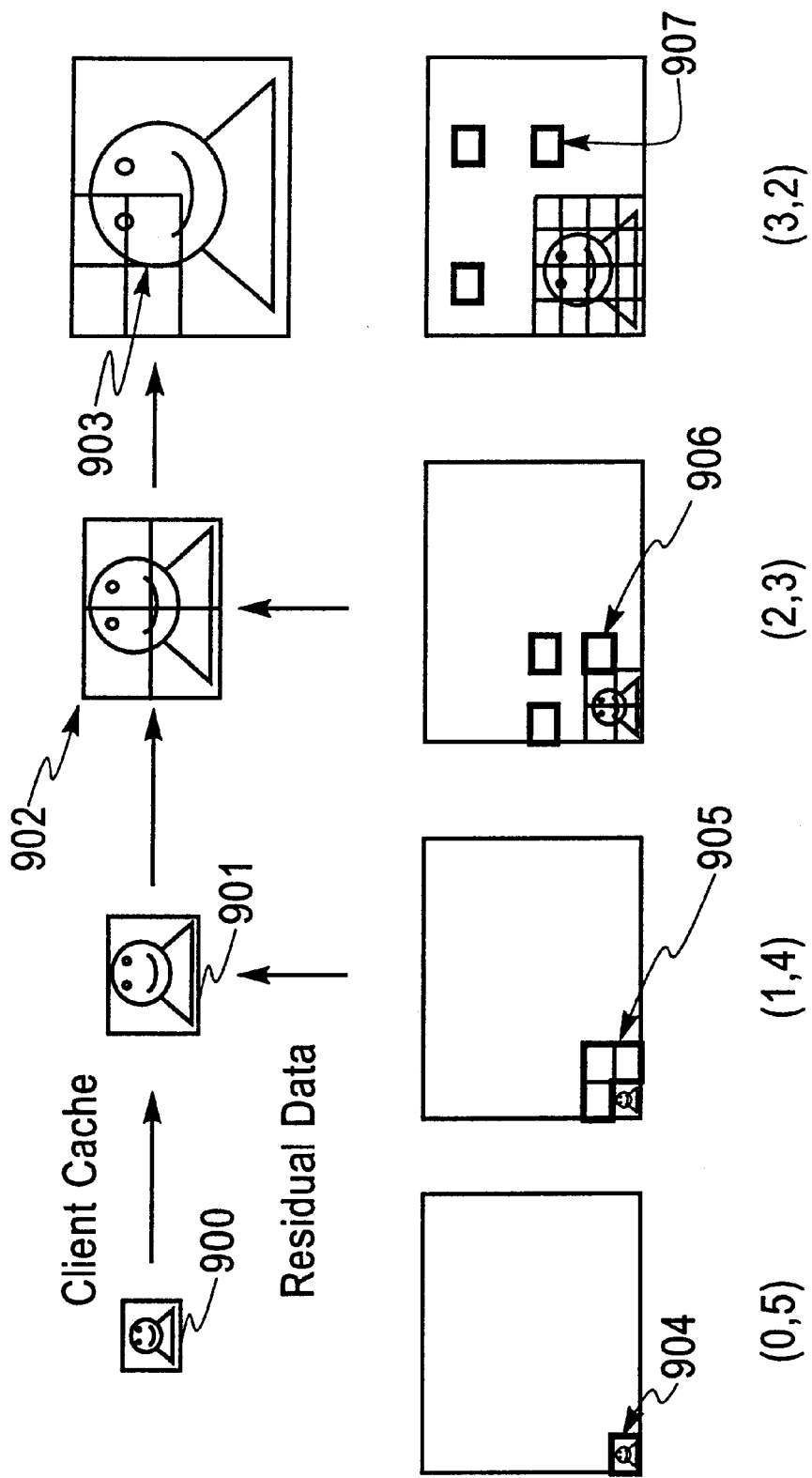
FIG. 9 illustrates an example process for interactively retrieving image views using the tiled-wavelet set of view elements.

FIG. 9 illustrates an example of a process for the interactive retrieval of views by the client (110). In this example, the initial view is retrieved from the SFGraph view element hierarchy data structure from the node block $(^{0,S})$ (904). This view element corresponds to a low-resolution view of the entire image. The view element is returned to the client and is stored in the client cache as view element (900). The client application subsequently requests a view that increases the magnification on a specific spatial area of the image view (900). The client retrieves additional view elements (905) from the server and combines them with the view element (900) from the client cache to synthesize the requested view (901).

In this example, the client repeats the process of zooming-in on spatial regions of the image two more times. In the first, the additional view elements (906) are retrieved from the server and are combined with the view element (901) in the client cache to synthesize the requested view (902). Lastly, additional view elements (907) are retrieved from the server and are combined with the view element (902) in the client cache to synthesize the requested view (903).

As described, this invention can be applied in a client-server system for retrieving views of satellite images, for example in precision farming. The application represents the images using the tiled-wavelet set of view elements selected from the space and frequency graph view element hierarchy. The client application utilizes a client-side cache in which to store the retrieved view elements of the satellite image in order to speed up the process of interactively retrieving views of the satellite images over the Internet. The specific details of an implementation of the present invention has been described through examples of the practice of the invention in the detailed description of the preferred embodiment.

The discussion above has focused on representing and retrieving images and multidimensional lattice data using view elements. Now that the invention has been described by way of a preferred embodiment, with alternatives, various modifications and improvements will occur to those of skill in the art. Thus, it should be understood that the detailed description should be construed as an example and not a limitation. The scope of the invention is properly defined by the appended claims.

References

The following references are hereby incorporated by reference herein in their entirety:

P. J. Burt and E. Adelson, The Laplacian Pyramid as a Compact Image Code, *IEEE Transactions on Communications* Vol. COM-31, No.4, April, 4, 1983.

R. Coifman and M. V. Wickerhauser, Entropy-Based Algorithms for Best Basis Selection, *IEEE Trans. on Information Theory*, Vol. 38, No. 2, March 1992.

Eastman Kodak Company. Flashpix Format and Architecture White Paper, Jul. 17, 1996.

H. Samet, The Quadtree and Related Hierarchical Data Structures, *ACM Computing Surveys*, Vol. 16, No. 2, 1984, pp. 187–260.

J. R. Smith and S.-F. Chang, Joint Adaptive Space and Frequency Basis Selection, *Proc. IEEE International Conf. on Image Processing* (ICIP-97), October, 1997.

J. W. Woods and S. D. O'Neil, Subband Coding of Images, *IEEE Trans. on Acoustics. Speech and Signal Processing*, Vol. ASSP-34, No. 5, October, 1986.

What is claimed is:

1. A computerized method for representing multi-dimensional data using view elements comprising the steps of:

constructing a view element data structure including node elements and decomposition and synthesis transition elements between the node elements, the transition elements defining decomposition and synthesis dependencies for processing the view elements;

ingesting the data into the node elements of the view element data structure, the node elements being at least one of a root element and a non-root element;

processing the view elements in accordance with the decomposition and synthesis transition elements of the view element data structure to generate other view elements in the view element data structure;

selecting a set of the view elements from the view element data structure; and storing the set of view elements, wherein in a client-server system for interactively retrieving a view of the data using the view elements, further comprising the steps of:

a client application issuing a view request;

receiving view elements from a server and storing them in a client-side cache in response to the view request;

examining subsequent view requests in accordance with the node elements and the decomposition and synthesis transition elements of the view element data structure to select associated view elements and identifying one or more of a client-side cache source and a server source for obtaining the associated view elements;

retrieving the associated view elements from the one or more sources;

processing the associated view elements in accordance with the decomposition and synthesis transition elements of the view element data structure; and generating and delivering the view to the client application.

2. The method of claim 1, further comprising the steps of:

said storing step including the step of compressing the set of view elements;

communicating a request for a view of the data;

selecting a set of view elements from the view element data structure by examining said view in accordance with the node elements and the decomposition and synthesis transition elements of the view element data structure;

retrieving selected view elements from storage and decompressing said view elements;

processing said view elements in accordance with the decomposition and synthesis transition elements of the view element data structure; and constructing the view of the data using the view elements, in response to said processing.

3. The method of claim 1, further comprising the step of constructing the view element hierarchy data structure using space and frequency graph.

4. The method of claim 1, further comprising the step of storing a tiled-wavelet set of view elements to represent the data.

5. The method of claim 1, further comprising the step of selecting the view element sets based on one or more of a compression rate-distortion performance; an additive cost function; a view retrieval speed; storage space constraints; and client or server processing constraints.

6. The method of claim 1, wherein the views and the view elements are in units of spatial blocks.

7. The method of claim 1, wherein said step of constructing a view element data structure uses one of a one-dimensional spatial quad-tree; a multi-dimensional spatial quad-tree; and a wavelet packet-tree.

8. The method of claim 1, wherein said compressing step further comprises the step of compressing the view elements without information loss.

9. The method of claim 2, wherein one or more of the views and view elements are constructed on one or more of a server, a proxy or a client in a computer network.

10. A computerized method for representing one or more satellite images, comprising the steps of:

constructing a space and frequency view element data structure which includes view elements connected by decomposition and synthesis transition elements;

ingesting satellite image data into the view elements;

processing the view elements in accordance with the elements;

ingesting satellite image data into the view elements;

processing the view elements in accordance with the decomposition and synthesis transition elements to generate other view elements in the data structure;

selecting a set of view elements from the view element data structure; and storing said set of view elements, wherein in a client-server system for interactively retrieving a view of the data using the view elements, further comprising the steps of:

a client application issuing a view request;

receiving view elements from a server and storing them in a client-side cache in response to the view request;

examining subsequent view requests in accordance with the node elements and the decomposition and synthesis transition elements of the view element data structure to select associated view elements and identifying one or more of a client-side cache source and a server source for obtaining the associated view elements;

retrieving the associated view elements from the one or more sources;

processing the associated view elements in accordance with the decomposition and synthesis transition elements of the view element data structure; and generating and delivering the view to the client application.

11. The method of claim 10, for constructing one or more views of the satellite image, comprising the steps of:

said storing step including the step of compressing and storing said set of view elements;

communicating a request for a view of the satellite image, the request specifying a region of interest in terms of a spatial dimension and a resolution;

selecting a subset of view elements from said set of view elements in the data structure by examining the view in accordance with the view elements and the decomposition and synthesis transition elements of the data structure;

retrieving said subset of view elements from storage and decompressing said subset of view elements;

processing said view elements in accordance with the decomposition and synthesis transition elements of the data structure; and generating the view of the satellite image, in response to said processing step.

12. A computerized method for construction one or more views of multi-dimensional data using view elements, comprising the steps of:

communicating a request for a view of the data;

selecting a set of view elements from a view element data structure by examining said view in accordance with node elements and decomposition and synthesis transition elements which connect the node elements of the view data structure, in response to said request, the transition elements defining decomposition and synthesis dependencies for processing the view elements;

retrieving selected view elements from storage;

processing the selected view elements in accordance with the decomposition and synthesis transition elements of the data structure, and generating said view, in response to said processing step, wherein in a client-server system for interactively retrieving a view of the data using the view elements, further comprising the steps of:
  a client application issuing a view request;
  receiving view elements from a server and storing them in a client-side cache in response to the view request;
  examining subsequent view requests in accordance with the node elements and the decomposition and synthesis transition elements of the view element data structure to select associated view elements and identifying one or more of a client-side cache source and a server source for obtaining the associated view elements;
  retrieving the associated view elements from the one or more sources;
  processing the associated view elements in accordance with the decomposition and synthesis transition elements of the view element data structure; and
  generating and delivering the view to the client application.

13. A computerized method for interactively retrieving views of multi-dimensional data, comprising the steps of:

communicating a request for a view of the data;

constructing a view element data structure which includes view elements connected by decomposition and synthesis transition elements, the transition elements defining decomposition and synthesis dependencies for processing the view elements;

constructing a client-side view element cache;

receiving view elements from the server, in response to said request;

ingesting the view elements into the data structure and storing them in the client-side cache;

examining subsequent client application view requests in accordance with the node elements and the decomposition and synthesis transition elements of the view element data structure to select view elements and identify one or more of a client cache source and a server source for obtaining selected view elements;

retrieving selected view elements from the one or more sources, including at least one view element stored in the cache;

processing said view elements in accordance with the decomposition and synthesis transition elements of the view element data structure in order to generate said view; and delivering said view to the client application, in response to said processing.

14. A computerized method for interactively retrieving the views of large satellite images, comprising the steps of:

communicating a request for a view of the satellite image, the request specifying a region of interest in terms of a spatial dimension and a resolution;

constructing a view element data structure which includes view elements connected by decomposition and synthesis transition elements, the transition elements defining decomposition and synthesis dependencies for processing the view elements;

constructing a client-side view element cache;

retrieving view elements from the server and storing them in the client-side cache, in response to said request;

examining subsequent requests for views of the satellite image to select view elements in accordance with the node elements and the decomposition and synthesis transition elements of the view element data structure and identifying one or more of a client cache source and a server source for obtaining selected view elements;

retrieving selected view elements from the one or more sources, including at least one view element stored in the cache;

processing said view elements in accordance with the decomposition and synthesis transition elements of the view element data structure in order to generate said view; and delivering said view to a client application.

* * * * *